United States Patent [19]
Sakamoto et al.

[11] Patent Number: 5,598,717
[45] Date of Patent: Feb. 4, 1997

[54] AIR CONDITIONER HAVING FROST PREVENTING MEMBER

[75] Inventors: Naohito Sakamoto, Ooizumimachi; Ichiro Kamimura, Kasakakemachi; Yukiharu Inoue, Ooizumimachi; Kazuhiro Shimura, Ojimamachi, all of Japan

[73] Assignee: Sanyo Electric Co., Ltd., Osaka, Japan

[21] Appl. No.: 536,441

[22] Filed: Sep. 29, 1995

[30] Foreign Application Priority Data

Nov. 29, 1994 [JP] Japan .................... 6-295333

[51] Int. Cl.⁶ .................................. F25B 13/00
[52] U.S. Cl. .................. 62/211; 62/223; 62/502; 62/150
[58] Field of Search .................. 62/210, 211, 223, 62/160, 150, 502, 114, 222, 224

[56] References Cited

U.S. PATENT DOCUMENTS

| | | | |
|---|---|---|---|
| 4,698,981 | 10/1987 | Kaneko et al. | 62/223 X |
| 5,425,246 | 6/1995 | Bessler | 62/211 |
| 5,440,895 | 8/1995 | Bahel et al. | 62/211 X |

*Primary Examiner*—Harry B. Tanner
*Attorney, Agent, or Firm*—Darby & Darby, PC

[57] ABSTRACT

An air conditioner using a non-azeotropic mixture refrigerant formed of a high boiling-point refrigerant and a low boiling-point refrigerant is provided with a first temperature sensor for detecting a temperature at an inlet of an outdoor heat exchanger when the outdoor heat exchanger serves as an evaporator in heating cycle, a second temperature sensor for detecting an outside air temperature, and a controller for controlling an opening degree of an expansion valve on the basis of a temperature difference between the outside air temperature and the inlet temperature of said evaporator. For example, the opening degree of the expansion valve is controlled so that the temperature difference between the outside air temperature and the inlet temperature is equal to a predetermined value.

4 Claims, 2 Drawing Sheets

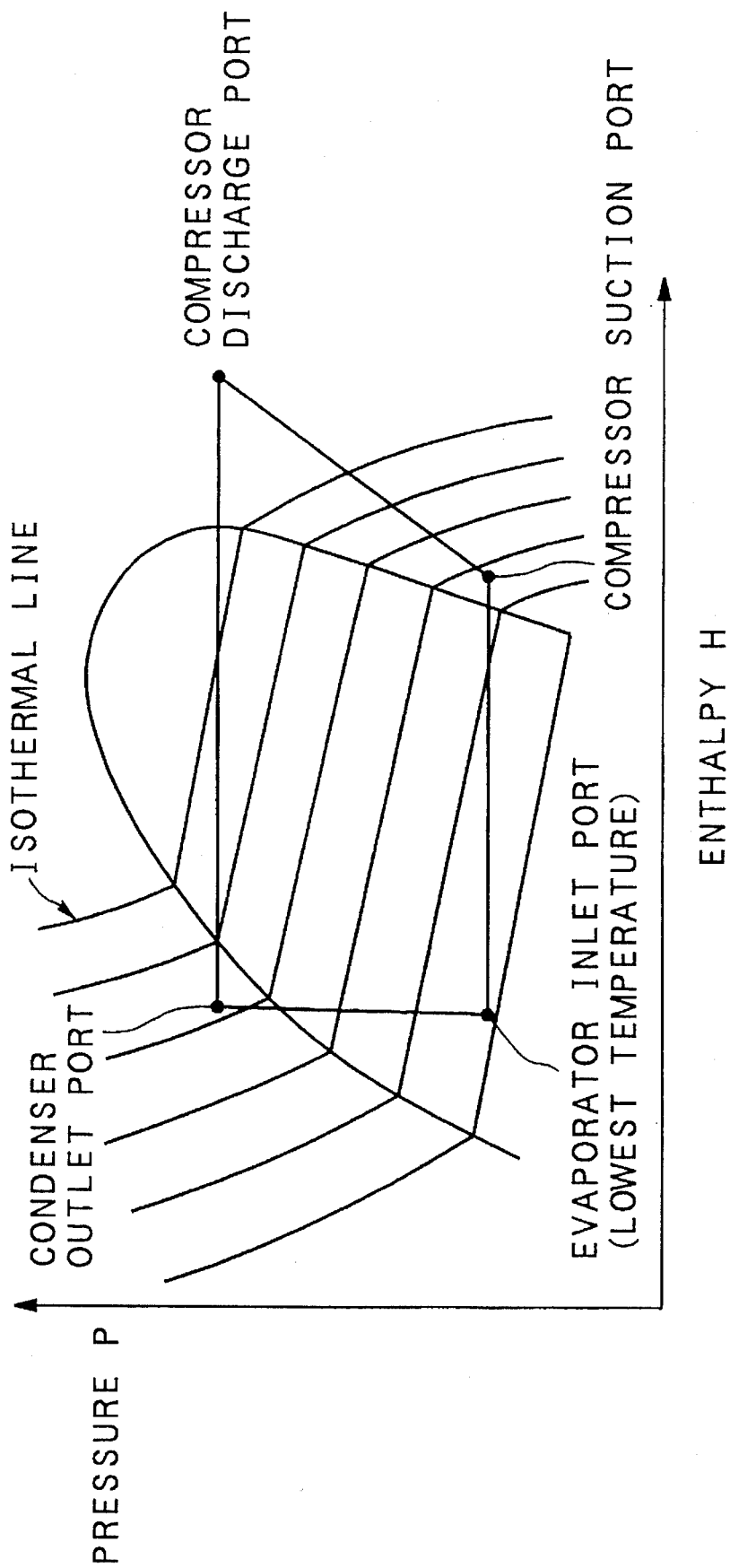

12,598,717

AIR CONDITIONER HAVING FROST PREVENTING MEMBER

BACKGROUND OF THE INVENTION

1. Field of the Invention

The present invention relates to an air conditioner, and more particularly to an air conditioner employing a non-azeotropic mixture refrigerant which is formed of a high boiling-point refrigerant and a low boiling-point refrigerant.

2. Description of the Related Art

In general, a conventional refrigerant circuit of a heat-pump type air conditioner comprises a compressor, an indoor heat exchanger, an expansion (pressure-reducing) device, an outdoor heat exchanger and a four-way valve. In heating cycle, refrigerant in the circuit circulates therethrough in this order. In cooling cycle, the refrigerant circulates through the circuit in the opposite direction to the flow as described above.

In the case where a single refrigerant such as "R-22" (i.e., chlorodifluoromethane) is used in the conventional heat-pump type air conditioner as described above, such single refrigerant is constant in pressure, and its temperature is also constant in vapor/liquid mixed phase, so that there is no temperature glide therein.

In the air conditioner using the single refrigerant, when the refrigerant is controlled in the outdoor heat exchanger serving as an evaporator in heating cycle, frosting temperature detection is conducted at not only an inlet of the outdoor heat exchanger, but also at an intermediate portion of the outdoor heat exchanger because the temperature of the intermediate portion is reduced to a value lower than that of the inlet due to pressure loss of the refrigerant. In general, frosting occurs when the inlet temperature of the outdoor heat exchanger is equal to or lower than −3° C.

Also, there has been recently known another conventional air conditioner which uses a non-azeotropic mixture refrigerant formed of a high boiling-point refrigerant and a low boiling-point refrigerant as a refrigerant for the air conditioner in view of prevention of depletion of a so-called ozone layer and other purposes.

When such a non-azeotropic mixture refrigerant is used in the air conditioner, the refrigerant is kept constant in pressure, and isothermal lines of the refrigerant obliquely extend from its saturated liquid line to its saturated vapor line in a down and right direction in vapor/liquid mixed phase as shown in FIG. 2 (i.e., obliquely extend toward the bottom right-hand corner of a graph shown in FIG. 2), so that a temperature glide occurs (for example, it corresponds to approximately 6° C. at 5Kg/cm$^2$). Consequently, in the air conditioner using the non-azeotropic mixture refrigerant, since the inlet of the outdoor heat exchanger serving as an evaporator becomes lowest in temperature due to the temperature glide of the refrigerant (provided that there is no other pressure loss of the refrigerant in the outdoor heat exchanger than the pressure loss due to the temperature glide), it is preferable to detect the temperature at the inlet of the outdoor heat exchanger when the frosting temperature detection is conducted.

The frosting of the outdoor heat exchanger serving as the evaporator depends on the outside air temperature. For example, even when the inlet temperature of the outdoor heat exchanger is equal to or higher than the frosting temperature, the frosting would often occur under such a condition that the outside air temperature is sufficiently low. Consequently, when the expansion valve is controlled only according to the inlet temperature of the outdoor heat exchanger, it is not possible to prevent the frosting of the outdoor heat exchanger without fail.

SUMMARY OF THE INVENTION

The present invention has been implemented to overcome the above problem, and has an object to provide an air conditioner which is capable of surely preventing the frosting of its outdoor heat exchanger when a non-azeotropic mixture refrigerant is used therein.

In order to attain the above object, according to a first aspect of the present invention, an air conditioner in which a non-azeotropic mixture refrigerant formed of a high boiling-point refrigerant and a low boiling-point refrigerant circulates through a refrigerant circuit comprising a compressor, an indoor heat exchanger, an expansion valve and an outdoor heat exchanger which are connected to one another in a loop form, is characterized by comprising a first temperature sensor for detecting an inlet temperature of an evaporator when the outdoor heat exchanger serves as the evaporator in heating cycle of the air conditioner, a second temperature sensor for detecting an outside air temperature, and a controller for controlling the opening degree of the expansion valve on the basis of a temperature difference between the outside air temperature and the inlet temperature of the evaporator.

According to a second aspect of the present invention, an air conditioner in which a non-azeotropic mixture refrigerant formed of a high boiling-point refrigerant and a low boiling-point refrigerant circulates through a refrigerant circuit comprising a compressor, an indoor heat exchanger, an expansion valve and an outdoor heat exchanger which are connected to one another in a loop form, is characterized by comprising a first temperature sensor for detecting an inlet temperature of an evaporator when the outdoor heat exchanger serves as the evaporator in heating cycle of the air conditioner, a second temperature sensor for detecting an outside air temperature, and a controller for controlling the opening degree of the expansion valve so that a temperature difference between the outside air temperature and the inlet temperature of the evaporator is equal to a predetermined value.

According to the first aspect of the present invention, the controller in the refrigerant circuit using the non-azeotropic mixture refrigerant controls the opening degree of the expansion valve on the basis of the temperature difference between the inlet temperature of the outdoor heat exchanger detected by the first temperature sensor and the outside air temperature detected by the second temperature sensor, thereby preventing occurrence of frosting of the outdoor heat exchanger. As described above, according to the present invention, the frosting of the outdoor heat exchanger can be surely prevented because the refrigerant is controlled on the basis of the temperature difference between the inlet temperature of the outdoor heat exchanger serving as the evaporator and the outside air temperature which is intimately associated with the frosting.

According to the second aspect of the present invention, the controller controls the opening degree of the expansion valve so that the difference between the outside air temperature from the second temperature sensor and the inlet temperature of the evaporator from the first temperature sensor is equal to a predetermined value, thereby preventing the occurrence of the defrosting in the outdoor heat exchanger. Therefore, the frosting of the outdoor heat exchanger can be surely prevented and a stable operation can be achieved.

BRIEF DESCRIPTION OF THE DRAWINGS

FIG. 2 is a Mollier diagram of a non-azeotropic mixture refrigerant used in the air conditioner of the present invention shown in FIG. 1.

DETAILED DESCRIPTION OF THE PREFERRED EMBODIMENT

Figure 1:
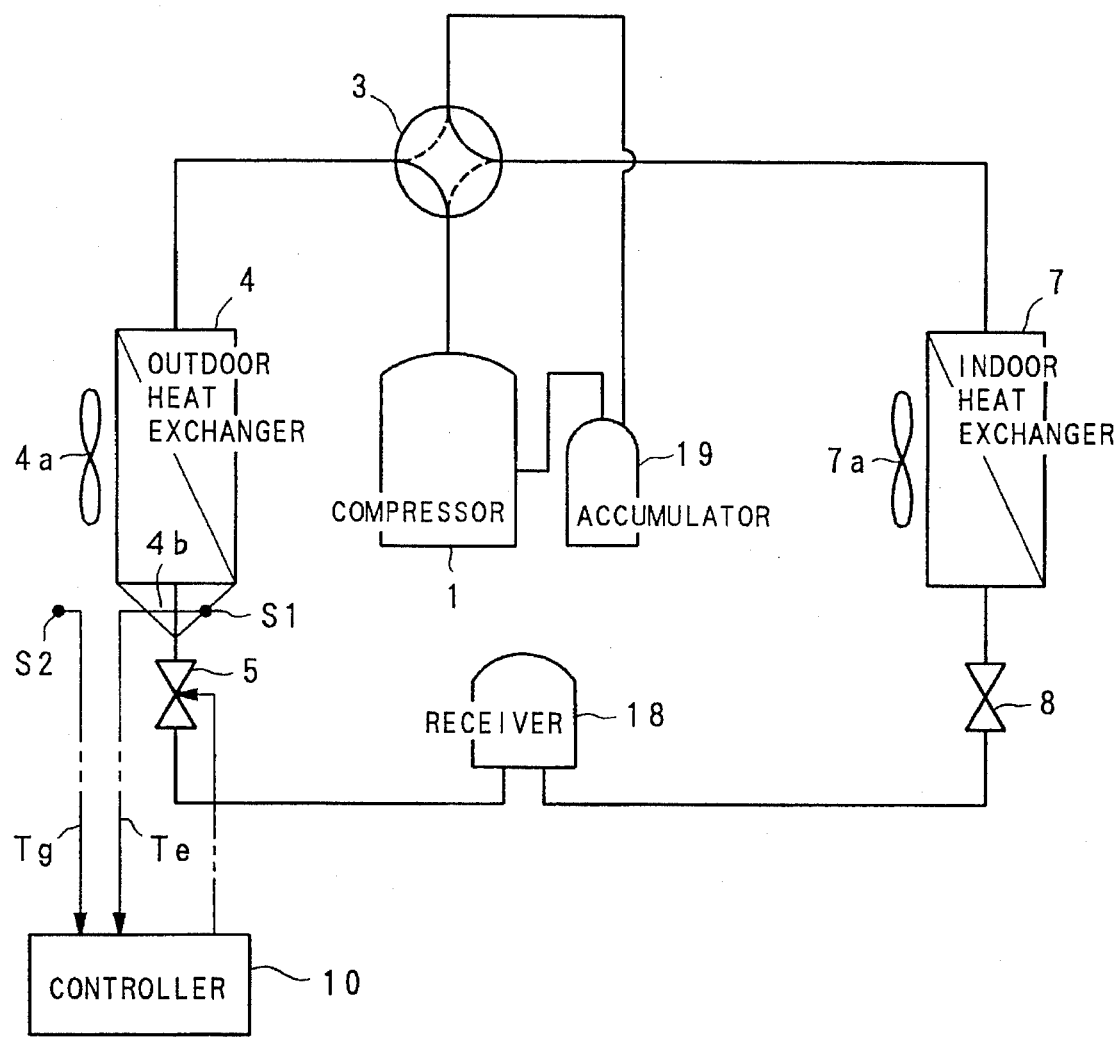
FIG. 1 is a schematic diagram of a refrigerant circuit of an air conditioner of the present invention.

A preferred embodiment according to the present invention will be hereunder described in detail with reference to the accompanying drawings.

FIG. 1 shows a heat-pump type air conditioner for performing heating and cooling cycles, which is a refrigerating device as an embodiment of the present invention. The refrigerating circuit of the air conditioner of this embodiment includes a compressor 1, a four-way valve 3, an outdoor heat exchanger 4, an electrically-driven expansion valve 5 which is substantially fully opened in cooling cycle, but controlled in its opening degree during heating cycle, a receiver 18, an electrically-driven expansion valve 8 which is controlled in opening degree during cooling cycle, but substantially fully opened in heating cycle, an indoor heat exchanger 7, an accumulator 19, etc., which are connected to a refrigerant pipe. In the refrigerant circuit thus constructed, the compressor 1 is connected to the outdoor heat exchanger through the four-way valve 3, and also it is connected to the outdoor heat exchanger 4 through the four-way valve 3. An electric expansion valve (expansion valve) 5 is disposed between the indoor heat exchanger and the receiver 18, and another electric expansion valve 8 is disposed between the outdoor heat exchanger 4 and the receiver 18. The outdoor heat exchanger 4 is provided with a fan 4a while the indoor heat exchanger 7 is provided with another fan 7a.

A controller 100 of the air conditioner of the present invention is connected to a first temperature sensor S1 for detecting an inlet temperature of the outdoor heat exchanger 4, a second temperature sensor S2 for detecting an outside air temperature, and the electrically-driven expansion valve 5.

As refrigerant which circulates through the refrigerant circuit of the air conditioner is used a non-azeotropic mixture refrigerant which is formed of a high boiling-point refrigerant and a low boiling-point refrigerant. The non-azeotropic mixture refrigerant is formed of a three-component mixed refrigerant, i.e., it is formed by mixing 52 wt. % of R134a (tetrafluoroethane), 25 wt. % of R125 (pentafluoroethane) and 23 wt. % of R32 (difluoroethane). In general, the boiling point of the R134a is −26° C., that of the R125 is −48° C., and that of the R32 is −52° C.

In the above-mentioned three-component mixed refrigerant having the above composition, during an evaporation step, both the R32 and the R125 having lower boiling points than the R134a are liable to evaporate prior to the R134a, and during a condensation step the R134a having a higher boiling point than the other two components are liable to be condensed prior to the other two components. As a result, the composition of the three-component mixed refrigerant varies in the heat exchanger, so that the temperature glide occurs as shown in FIG. 2. Therefore, when the heat exchanger serves as an evaporator, the inlet temperature of such an evaporator becomes lowest.

Now, an operation of the embodiment of the present invention will be described.

[IN COOLING CYCLE OR OPERATION]

In the refrigerant circuit of the air conditioner shown in FIG. 1, the outdoor heat exchanger 4 serves as a condenser in the cooling cycle. At this time, the four-way valve 3 works to be located as shown by a solid line of FIG. 1d, and the refrigerant is discharged from the compressor 1 and circulates sequentially through the four-way valve 3, the outdoor heat exchanger 4, the electrically-driven expansion valve 5 (substantially fully opened), the receiver 18, the electrically-driven expansion valve 8, the indoor heat exchanger 7, the four-way valve 3, the accumulator 19 and the compressor 1 in this order.

[IN HEATING CYCLE OR OPERATION]

In the heating cycle, the indoor heat exchanger 7 serves as a condenser while the outdoor heat exchanger 4 serves as an evaporator. At this time, the four-way valve 3 works to be located as shown by a dotted line of FIG. 1. Consequently, the refrigerant discharged from the compressor 1 circulates sequentially through the indoor heat exchanger 7, the electrically-driven expansion valve 8, the receiver 18, the electrically-driven expansion valve 5 (substantially fully opened), the outdoor heat exchanger 4, the four-way valve 3, the accumulator 19 and the compressor 1.

In the case where the non-azeotropic mixture refrigerant is used in the air conditioner, the temperature glide shown in FIG. 2 occurs, and the temperature at the inlet 4b of the outdoor heat exchanger 4 serving as an evaporator becomes lowest due to the temperature glide.

Occurrence of frosting starts at the time when the temperature of the evaporator is reduced to a prescribed frosting temperature or less, and the frosting reduces the heating capability of the air conditioner considerably. Therefore, the frosting is prevented through the following control by the controller 100.

The controller 100 of the air conditioner controls the opening degree of the electrically-driven expansion valve 5 in the heating cycle on the basis of the temperature difference between an outside air temperature Tg and a temperature Te at the inlet 4b (hereinafter referred to as "inlet temperature Te") of the evaporator 4 as shown in the following equation (1):

$$Te = Tg - \alpha \tag{1}$$

wherein α represents a predetermined constant value.

As described above, the frosting of the evaporator is prevented by controlling the opening degree of the electrically-driven expansion valve 5 on the basis of both the inlet temperature of the evaporator and the outside air temperature which is intimately associated with the frosting.

For example, it is a general matter in the non-azeotropic mixture refrigerant that the outdoor heat exchanger 4 serving as the evaporator is frosted through a superheating control under a heating standard condition (indoor temperature: 20° C., and outside air temperature: 7° C.). Accordingly, it is necessary to keep the temperature Te of the inlet 4b of the evaporator 4 to be higher than the limit (maximum) temperature at which the frosting occurs. For example, the predetermined constant value α is experimentally obtained and it is set to 9° C. in the above equation (1) which is a relational expression between the temperature Te of the inlet 4b of the evaporator and the outside air temperature Tg. In this case, the flow of the non-azeotropic mixture refrigerant (the opening degree of the expansion valve 5) is controlled so as to satisfy the following equation:

$$Te=Tg-9 \qquad (2)$$

whereby the heating operation is carried out without inducing the frosting in the outdoor heat exchanger 4 serving as the evaporator and thus without reducing the heating capability of the air conditioner.

Assuming that the outside air temperature Tg is equal to 7° C. in the above equation (2), an appropriate value of the inlet temperature Te of the evaporator at which the heating operation can be performed without inducing frost, is calculated into −2° C.

For example, assuming an actually measured value of the inlet temperature Te of the evaporator to be 3° C., the electrically-driven expansion valve 5 shown in FIG. 1 is controlled to be reduced in its opening degree so that the inlet temperature Te of the evaporator approaches to the appropriate value of −2° C. because the measured value 3° C. is higher than a target value −2° C. of the inlet temperature Te as described above, On the other hand, assuming the actually measured value of the inlet temperature Te of the evaporator to be −5° C., the electrically-driven expansion valve 5 shown in FIG. 1 is controlled to increase its opening degree so that the inlet temperature Te of the evaporator approaches to the appropriate value of −2° C. because the actually measured value −5° C. is lower than the target value −2° C. of the outside air temperature As described above, during the refrigerating cycle in which the non-azeotropic mixture refrigerant having the temperature glide is circulated through the refrigerant circuit, the refrigerant in the outdoor heat exchanger serving as an evaporator is controlled on the basis of the temperature difference between the outside air temperature and the inlet temperature of the evaporator, so that the non-azeotropic mixture refrigerant is properly controlled so that no frosting is induced, and thus the heating operation can be performed without reducing the heating capability of the air conditioner.

According to the present invention, in the refrigerant circuit using the non-azeotropic mixture refrigerant, the controller of the air conditioner controls the opening degree of the expansion valve on the basis of the outside air temperature detected by the second temperature sensor and the inlet temperature of the evaporator detected by the first temperature sensor, thereby preventing frosting from occurring in the outdoor heat exchanger. In the air conditioner of the present invention, the refrigerant is controlled on the basis of the temperature difference between the inlet temperature of the evaporator and the outside air temperature, which is intimately associated with the frosting, so that the frosting can be surely prevented from occurring in the outdoor heat exchanger.

Furthermore, according to the present invention, the controller as described above controls the opening degree of the expansion valve so that the temperature difference between the outside temperature detected by the second temperature sensor and the inlet temperature of the evaporator detected by the first temperature sensor are equal to a predetermined value, thereby preventing the outdoor heat exchanger from being frosted. Therefore, the outdoor heat exchanger can be surely prevented from being frosted, and also a stable operation of the air conditioner can be performed.

What is claimed is:

1. An air conditioner in which a non-azeotropic mixture refrigerant formed of a high boiling-point refrigerant and a low boiling-point refrigerant circulates through a refrigerant circuit comprising a compressor, an indoor heat exchanger, an expansion valve and an outdoor heat exchanger which are connected to one another in a loop form, characterized by comprising:

a first temperature sensor for detecting a temperature at an inlet of said outdoor heat exchanger when said outdoor heat exchanger serves as an evaporator in heating cycle;

a second temperature sensor for detecting an outside air temperature; and a controller for controlling an opening degree of said expansion valve on the basis of a temperature difference between the outside air temperature and the inlet temperature of said evaporator.

2. The air conditioner as claimed in claim 1, wherein said controller controls the opening degree of said expansion valve so that the temperature difference between the outside air temperature and the inlet temperature of said evaporator is equal to a predetermined value.

3. The air conditioner as claimed in claim 2, wherein said controller controls the opening degree of said expansion valve so as to satisfy the following equation: $Te=Tg-\alpha$ here, Te represents the inlet temperature, Tg represents the outside air temperature, and $\alpha$ represents a predetermined constant value.

4. The air conditioner as claimed in claim 3, wherein said controller reduces the opening degree of said expansion valve when an actually-measured inlet temperature of said evaporator is higher than the inlet temperature Te, and increases the opening degree of said expansion valve when the actually-measured inlet temperature of said evaporator is lower than the inlet temperature Te.

\* \* \* \* \*